Jan. 18, 1966 A. L. ALBERS 3,229,734
LUMBER MEASURING CONVEYOR TABLE AND TRAVELING
CARRIAGE CUT-OFF SAW COMBINATION
Filed Feb. 3, 1964 2 Sheets-Sheet 1

INVENTOR.
ARCHIE L. ALBERS
BY Kimmel & Crowell
ATTORNEYS.

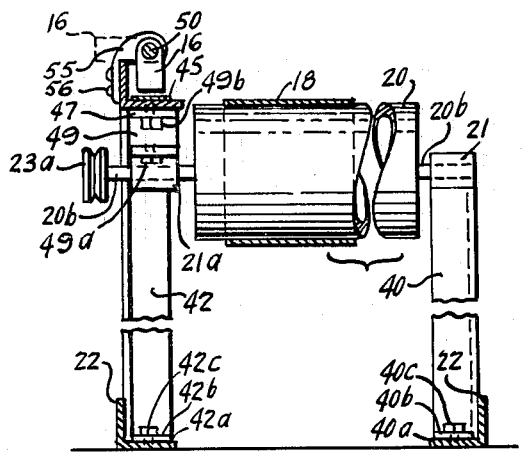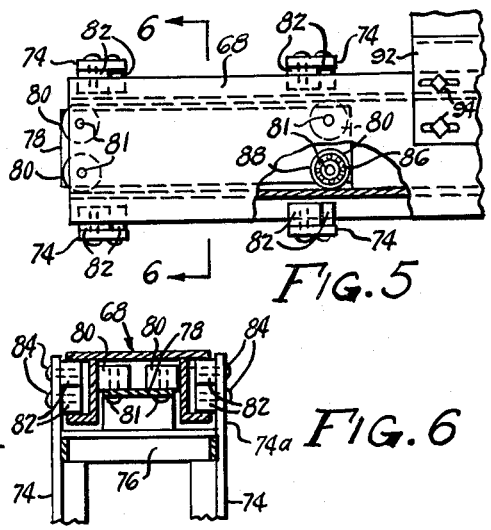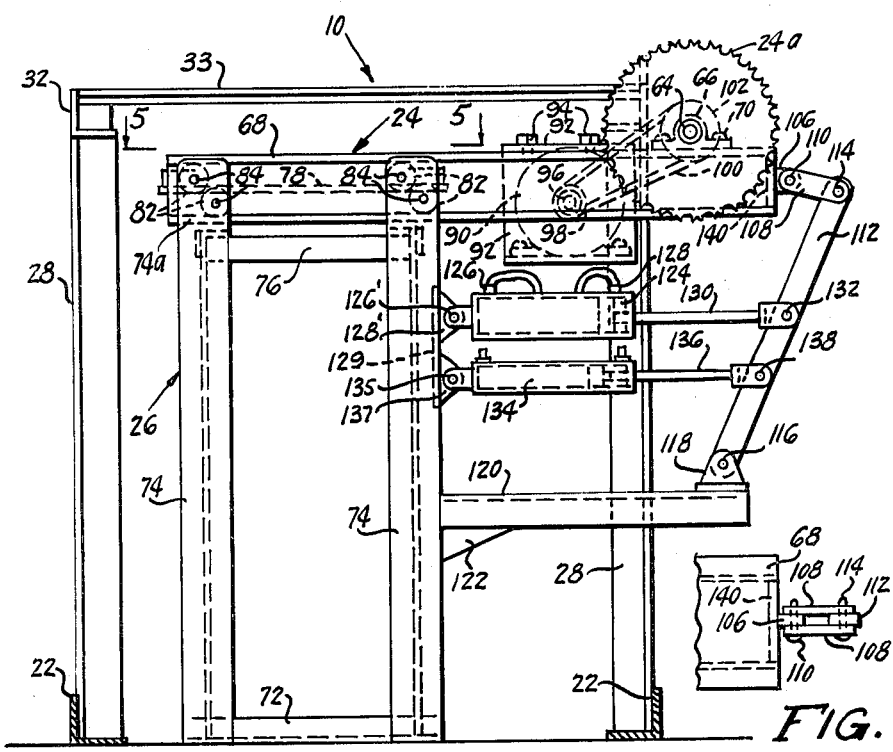

United States Patent Office

3,229,734
Patented Jan. 18, 1966

3,229,734
LUMBER MEASURING CONVEYOR TABLE AND TRAVELING CARRIAGE CUT-OFF SAW COMBINATION
Archie L. Albers, Yuba City, Calif.
(6465 Larry Way, North Highlands, Calif.)
Filed Feb. 3, 1964, Ser. No. 342,139
18 Claims. (Cl. 143—47)

This invention relates to a new and improved lumber conveyor table and cutoff saw combination, and more particularly, to a combined lumber rest table means and measuring conveyor table means cooperating in spaced relationship about a traveling carriage cutoff saw supported beneath said table means which permits full viewing of all saw cuts of lumber. Reference is made to my copending application entitled, "Lumber Rest Table and Measuring Conveyor Table Combination for a Cut-Off Saw," Serial No. 342,141, filed on an even date herewith.

In the past, saw cutoff attachments usually were suspended at a level below the main portion of the cutoff saw, making operation thereof very hazardous to an operator's hands and prohibited a clear view of the parting saw cut of lumber lengths for each crosscut operation of the saw.

The instant invention solves the above problems by providing a very accurate cutoff saw means below the combined saw table and further provides automatic lumber conveying means saving labor and permitting more efficient operation thereof in accordance with proper safety standards with regard to an operator's hands, during placing, measuring and sawing lumber thereon into designated lengths and conveying sawed lumber therefrom.

A primary object of this invention is to provide a new lumber measuring conveyor table and movable carriage cutoff saw combination for measuring, sawing and conveying lumber therefrom.

A further object of the invention is to provide a new measuring conveyor table and movable carriage cutoff saw combination which is simple of construction, has a minimum number of parts and is easy to manufacture.

Another object of this invention is to provide a safe conveying table and lumber measuring stop means cooperating with a traveling carriage actuated cutoff saw means beneath said table.

Another object of the invention is to provide a positive safety table means and horizontally movable cutoff saw combination for accurately cutting selected lengths of lumber thereon.

A further object of the invention is to provide a positive measuring stop and guide means in cooperation with a cutoff saw for directing sawed lengths of lumber onto a conveyor belt means.

Other objects and many attendant advantages of the instant invention will be readily appreciated as the same become better understood by reference to the following detailed description when considered in connection with the accompanying drawings, in which:

FIGURE 3 is a fragmentary cross-sectional view taken substantially on lines 3—3 of FIGURE 1 in the direction of the arrows;

FIGURE 4 is a transverse cross-sectional view of the horizontally actuated cutoff saw means taken on lines 4—4 of FIGURE 1 in the direction of the arrows;

FIGURE 5 is a plan view in partial cross-section of the horizontally actuated carriage of the cutoff saw means of FIGURE 4, taken on lines 5—5 in the direction of the arrows;

FIGURE 6 is a cross-sectional view of the saw carriage means of FIGURE 5, taken on lines 6—6 in the direction of the arrows; and FIGURE 7 is an enlarged detail plan view of a portion of the actuating linkage means connected to the distal end of the movable saw carriage means of the invention.

Figure 1:
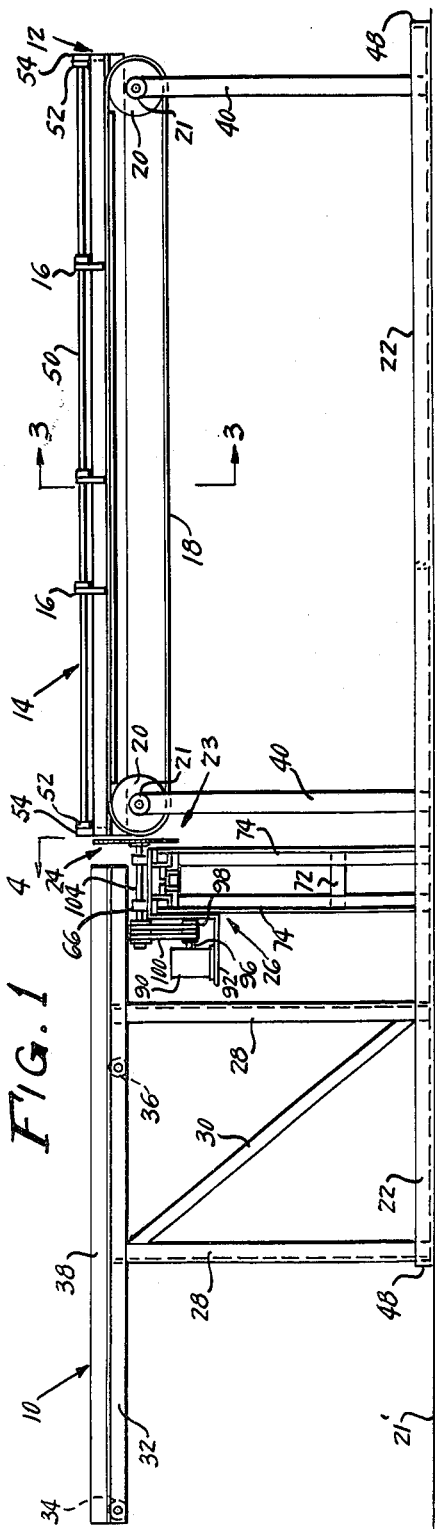
FIGURE 1 is a view in elevation of the conveyor table, measuring guide means, rest table means and stop means cooperating with a horizontally traveling carriage actuated cutoff saw means supported below the table combination, as shown.
Figure 2:
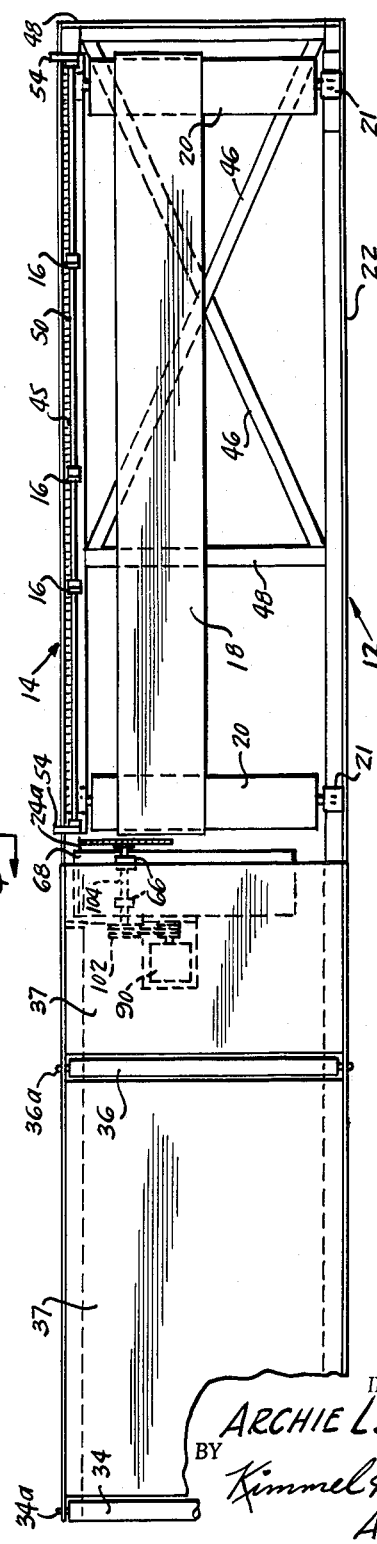
FIGURE 2 is a plan view of FIGURE 1.

Referring more specifically to the drawings, in which like reference numerals designated like parts throughout the drawings, FIGURES 1, 2, 3, 4, 5, 6, and 7 show a preferred embodiment of the invention which, in general, is comprised of a work material rest table portion 10, a conveyor table portion 12, measuring guide means 14, stop means 16, conveyor belt means 18, roller means 20, support frame means 22 and cutoff saw means 24 with supporting stand 26.

Rest table means 10 is comprised of upright support members 28, lateral structural members 29, and diagonal structural members, all bolted, welded or suitably attached together and fixedly supported by a portion of base frame means 22. Upright support structural members 28, front and back side angle members 32, back angle member 38 and two deck plate members 33 welded or bolted together with roller means 34 mounted on shaft means 34a in bearing means 36 in angle members 32.

Conveyor table portion 12 is comprised of upstanding front and back structural support members 40 and 42, respectively; back angle means 44 rigidly joining together back support members 42 by being fixedly secured together by welding, bolts or other conventional means. Support frame means 22 below conveyor table portion 12 is laterally secured together by transverse members 46 and lateral members 48 welded together or fixedly secured together by bolts or other conventional means. Roller means 20 are supportably carried by shaft means 20a and 20b in bearing means 21 of structural members 40 and bearing means 21a secured by bolt means 49a to bracket support means 49 which is in turn adjustably secured by bolt means 49b and slot means 47 in bracket means 49 to back angle means 44. Structural support members 40 and 42 at the distal end of conveyor table means 12 terminate at their lower ends in foot means 40a and 42a, respectively, each having adjustable slot means 40b and 42b therein, as best shown in FIGURE 3, and adjustably secured to frame means 22 by set screw means 40c and 42c, respectively. Roller means 20 carry conveyor belt means 18. Shaft means 20b terminates in an extended portion adapted to fixedly receive pulley means 23a secured thereto by set screw, key means or other conventional means, not shown. Pulley means 23a may be energized by a motor means, as understood by those skilled in the art, as best shown in FIGURE 3.

Measuring guide means 14 is comprised of a lateral rod means 50 secured in bearing means 52 in bearing support means 54 carried by angle means 44 and secured by rivet or bolt means 56. Measuring rod means 50 rotatably carries a plurality of stop members 16 thereon in a spaced longitudinal relationship. Angle means 44 may have a conventional measuring scale indicia means 45 suitably inscribed thereon or attached by screw, or other conventional means thereto, as desired.

Stop means 16 when not being used are rotated out of lumber abutting position, except the selected abutting stop means 16 used with a selected length of lumber to be sawed. The inoperative position of stop means 16 is shown in broken lines in FIGURE 3. Stop means 16 is secured by set screw or any suitable detent means connected to slidable and rotatable bearing means on rod means 50. One of the novel features of this invention resides in the dual function of stop means 16, which serves both as a lumber measuring stop means for a selected length of lumber prior to being cut, and also permits a selected cut of lumber to be removed by conveyor belt means 18. For example, a designated length of lumber is measured on angle means 44 and indicia means 45, sawed to a desired length, and is removed by conveyor belt means 18 after sawing, without additional manual or other manipulation. Since only a very small portion of the edge of the board is held by the stop, and since the conveyor belt 18 is slightly lower than the surface of index 45 (see FIG. 3), the slight friction of the saw blade as it moves back against the end of the severed section, plus the force of gravity is sufficient to disengage this small end portion of the severed piece from the stop and permit the belt to carry the piece away.

Belt means 18 is adjusted by a tightening means comprising one pair back and front support members 40 and 42 being adjustably attached to frame means 22 and slot means 40b and 42b by bolt means 40c and 42c, respectively, cooperating with slot means 47 in bracket means 49, secured by bolt means 49b to longitudinal angle means 44. Bracket means 49 supports bearing means 21a for axle or shaft means 20b of back roller means 20 by bolt means 49a, as best shown in FIGURE 3.

Saw means 24 is comprised of a disc saw means 24a fixedly mounted on shaft means 64 in mandrel bearing means 66 mounted on traveling reciprocating carriage means 68 by bolt means 70.

Carriage means 68 is of a cross-section as best shown in FIGURE 6.

Saw support means 26 is comprised of lateral base means 72, upstanding leg members 74, upper lateral members 76 on which is mounted structural frame means 78 which carries roller members 80 on spindle means 81. Upstanding support members 74 suitably carry on their upper end portions 74a roller means 82 mounted on spindle means 84 by conventional ball bearing means 86 and race means 88.

Motor means 90 for energizing saw means 24, is adjustably mounted on bracket means 92 by conventional slot and bolt means. Bracket means 92 is attached by bolt means 94 to carriage means 68, as best shown in FIGURE 4. Motor means 90 is operatively connected by shaft means 96, pulley means 98 and belt means 100 to pulley means 102 fixedly connected by screw or other conventional means to shaft means 104 fixedly secured to saw disc means 24a.

The rear end portion of saw carriage means 68 fixedly carries bracket means 106 which is pivotally connected to one end of link means 108 by bolt or pin means 110 for proper operation of belt means 100. The distal end of link means 108 is pivotally connected to common linkage means 112 by pin or bolt means 114 and the lower end of linkage means 112 is pivotally connected by bolt means 116 to lug means 118. Lug means 118 is fixedly secured by welding or other conventional means to bracket means 120 and gusset plate means 122. Bracket means 120 and plate means 122 are welded or fixedly secured in a conventional manner to supporting leg means 74, as best shown in FIGURE 4.

The prime moving actuating means for saw carriage means 68 is comprised of double acting air cylinder means 124 of a conventional type, having compressed air connections means 126 and 128 connected to a conventional compressed air supply (not shown). Air cylinder means 124 is pivotally connected by pin means 126 to lug means 128 fixedly secured to lateral member 129 welded to support members 74. Air cylinder means 124 is operatively connected by piston rod means 130 to linkage means 112 by pivot means 132.

During the reciprocal movements of common linkage means 112, buffer atmospheric air cylinder means 134 serves as a dampening means to vibrations, hunting and shock impulsive forces exerted on linkage means 112 by air acuated cylinder means 124. Buffer air cylinder means 134 is connected by piston rod means 136 and pin means 138 to linkage means 112 and by pin means 135 and bracket means 137 welded to lateral member 129 suitably secured to support members 74.

FIGURE 7 discloses bracket means 106 fixedly and conventionally connected by linkage means 108 to common linkage means 112.

During operation of the instant inventive combination, lumber prior to being cut to selected lengths is deposited on rest table means 10 with its distal ends extending along index means 45 and conveyor table means 12 abutting a selected downwardly positioned stop means 16, for a particular length of lumber to be sawed, after which air cylinder 124 is actuated by connections 126 and 128 connected to a conventional compressed air supply (not shown) to energize linkage means 112 and saw carriage means 68 in a desired reciprocating horizontal movement depending on the width of lumber to be sawed.

The air valve means for controlling air cylinder 124 is conventional and is therefore, not shown for clarity.

Buffer or atmospheric air cylinder 134 serves as a shock resistant, dampening or stabilizing force cooperating with the parallel actuation of compressed air actuated cylinder means 124 during sawing lumber.

Double-acting buffer air cylinder 134 may be of a type described in detail in my copending application, entitled "Double Acting Buffer Air Cylinder," Serial No. 342,136, filed on an even date herewith.

One of the novelties of this inventive combination is the extreme accuracy that the traveling carriage means 24 provides in the above table and saw combination.

From the foregoing it will now be seen that there is herein provided a new and improved lumber measuring conveyor table and horizontally traveling cutoff saw combination which accomplishes all the objects of this invention, and others, including many advantages of great practical utility and commercial importance.

It is to be understood, of course, that the foregoing disclosure relates to a preferred embodiment of the invention as illustrated, that various modifications and changes may be made in the invention by those skilled in the art without departing from the spirit and scope of the invention as set forth in the appended claims.

I claim:

1. A lumber measuring conveyor table and traveling carriage cutoff saw combination comprising a carriage actuated cutoff saw means, a rest table means, conveyor table means accurately cooperating with said rest table means in spaced relationship about said cutoff saw means, said conveyor table means comprising a lumber measuring and abutting stop and guide means cooperating with designated sawed cutoff lengths of lumber, said saw means comprising a transverse traveling saw carriage means including a plurality of bearing means cooperating with a track means for cross reciprocating movement of said saw means to cut preselected lengths of lumber, and double actuating cylinder means for operating said cutoff saw carriage means.

2. A lumber measuring conveyor table and traveling carriage cutoff saw combination as in claim 1, comprising plural linkage means interconnecting said cylinder means to said traveling carriage means.

3. A lumber measuring conveyor table and traveling carriage cutoff saw combination as in claim 2, wherein said conveyor table means comprises a conveyor belt means driven by a pulley and conventional motor means.

4. A lumber measuring conveyor table and traveling carriage cutoff saw combination as in claim 3 wherein said abutting stop and guide means is located in such spaced relationship with respect to said conveyor belt means that a sawed length of lumber is conveyed from the saw off the distal end of said conveyor table means.

5. A lumber measuring conveyor table and traveling carriage cutoff saw combination as in claim 4, wherein said saw means comprises a double acting air actuated cylinder and linkage means for laterally operating said supporting traveling carriage and saw means.

6. A lumber measuring conveyor table and traveling carriage cutoff saw combination as in claim 5, wherein said conveyor table means comprises indicia scale means cooperating with said abutting stop and guide means.

7. A lumber measuring conveyor table and traveling carriage cutoff saw combination, as in claim 6, wherein said conveyor table means comprises a plurality of selectively spaced abutting stop means cooperating with said indicia scale measuring means.

8. A lumber measuring conveyor table and traveling carriage cutoff saw combination, as in claim 7, wherein said cutoff saw means comprises a buffer air cylinder means coacting in parallel relationship with said actuating cylinder means for smooth and rapid operation for said saw means.

9. A lumber measuring conveyor table and traveling carriage cutoff saw combination comprising cutoff saw means, a reciprocating carriage means operatively carrying said cutoff saw means, conveyor table means cooperating with said rest table means in spaced relationship about said cutoff saw means; said rest table means comprising top deck means, back means and roller support means for cooperating together in moving lumber deposited thereon, said conveyor table means comprising conveyor belt means, lumber measuring means, stop means and guide means cooperating with designated sawed cutoff lengths of lumber, said saw means being reciprocably actuated transverse to the table means by an actuating cylinder means and plural linkage.

10. A lumber measuring conveyor table and traveling carriage cutoff saw combination as in claim 9, wherein said saw means comprises a double acting buffer cylinder means and linkage means coacting with said saw and table means for smooth and accurate operation thereof.

11. A lumber measuring conveyor table and traveling carriage cutoff saw combination, as in claim 10, wherein said conveyor table means comprises indicia scale means cooperating with said saw means and conveyor table means.

12. A lumber measuring conveyor table and traveling carriage cutoff saw combination, as in claim 11, wherein said saw means is structurally supported free of said table means.

13. A traveling carriage actuated cutoff saw comprising saw means, reciprocating carriage actuated support means for said saw means, energizing means for said saw means supported by said carriage support means, dual support means for said carriage support means and energizing means, track and bearing means operatively interconnecting said carriage support means and said dual support means, linkage means operatively connecting said carriage support means with said dual support means for transverse operation of said saw means, and energized reciprocating means operatively connected to said linkage means to selectively operate said carriage support means.

14. A traveling carriage actuated cutoff saw as in claim 13, wherein said carriage actuated support means and said energizing means are in operational alignment for proper operation thereof for accurately sawing lengths of lumber therewith.

15. A traveling carriage actuated cutoff saw as in claim 14, comprising a buffer reciprocating means connected in parallel operating arrangement with said energized reciprocating means for smooth transverse operation of said cutoff saw.

16. A traveling carriage operated and energized cutoff saw comprising disc saw means, reciprocating actuated carriage support means for said saw means, motor energizing means for said saw means supported by said carriage support means, dual support means for said saw and energizing means, track and bearing means operatively interconnecting said carriage support means and said dual support means, multiple linkage means operatively connecting said dual support means with said reciprocating saw carriage support means, and air actuated reciprocating cylinder means operatively connected to said linkage means and said dual support means to transversely operate said saw means to accurately saw lengths of lumber.

17. A traveling carriage operated and energized cutoff saw as in claim 16, wherein said reciprocating actuated carriage support means for said saw means and said energizing means are in alignment for operation thereof.

18. A traveling carriage operated and energized cutoff saw as in claim 17, comprising a buffer reciprocating air cylinder means connected in parallel operating arrangement with said air actuated reciprocating cylinder means by being pivotally connected between said linkage means and said dual support means for said energized saw means.

References Cited by the Examiner

UNITED STATES PATENTS

| | | | |
|---|---|---|---|
| 1,759,835 | 5/1930 | Boynton | 143—168 |
| 2,515,008 | 7/1950 | Humphrey. | |
| 3,024,818 | 3/1962 | Scoville. | |

WILLIAM W. DYER, Jr., *Primary Examiner.*

W. D. BRAY, *Examiner.*